Figures 1, 12:
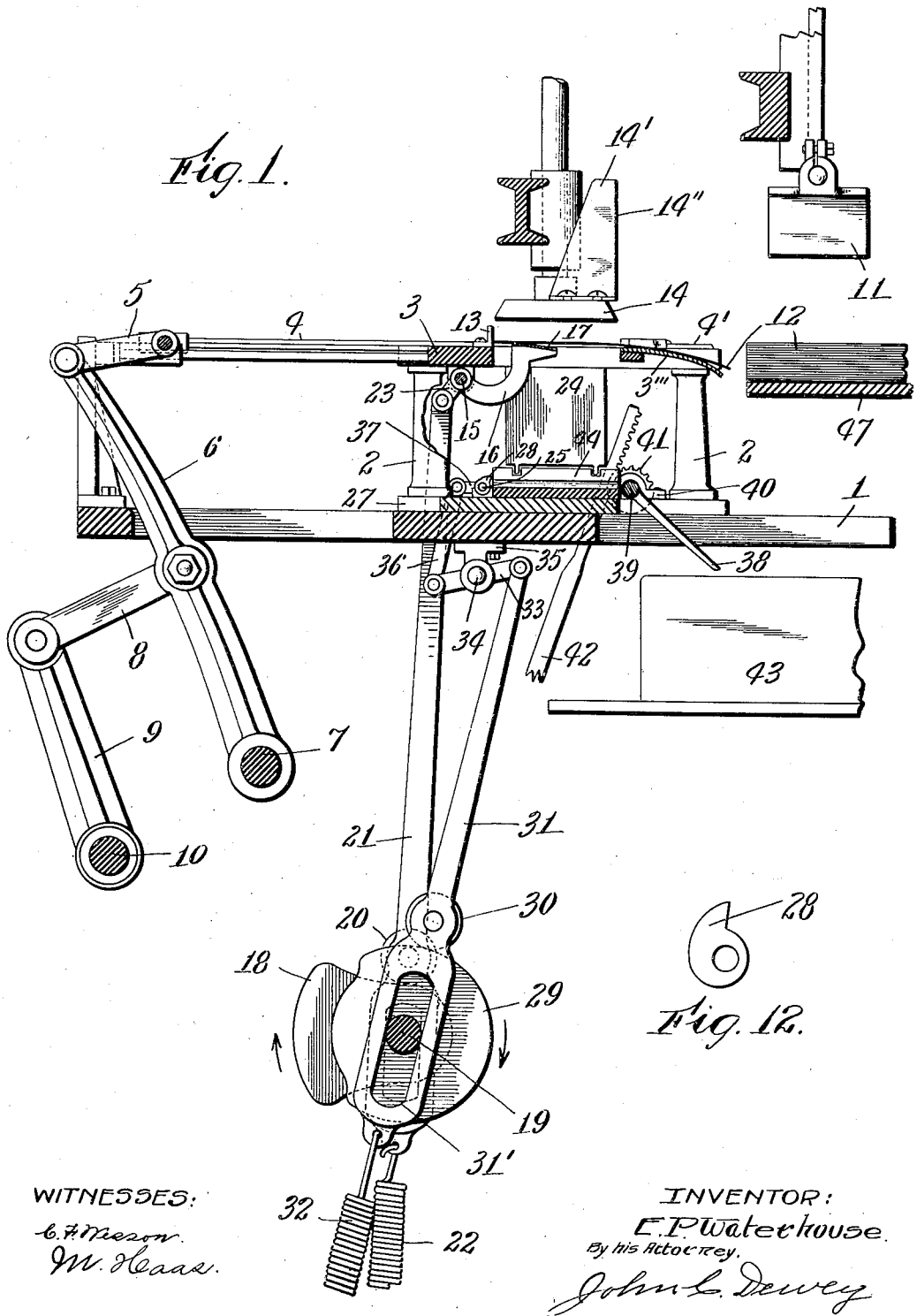

No. 890,829. PATENTED JUNE 16, 1908.
E. P. WATERHOUSE.
ENVELOP MACHINE.
APPLICATION FILED JULY 5, 1904.

5 SHEETS—SHEET 1.

WITNESSES:
C. F. Meson
M. Haas.

INVENTOR:
E. P. Waterhouse
By his Attorney,
John L. Dewey

No. 890,829.

PATENTED JUNE 16, 1908.

E. P. WATERHOUSE.
ENVELOP MACHINE.
APPLICATION FILED JULY 5, 1904.

5 SHEETS—SHEET 2.

WITNESSES:

INVENTOR:
E. P. Waterhouse.
By his Attorney
John C. Dewey

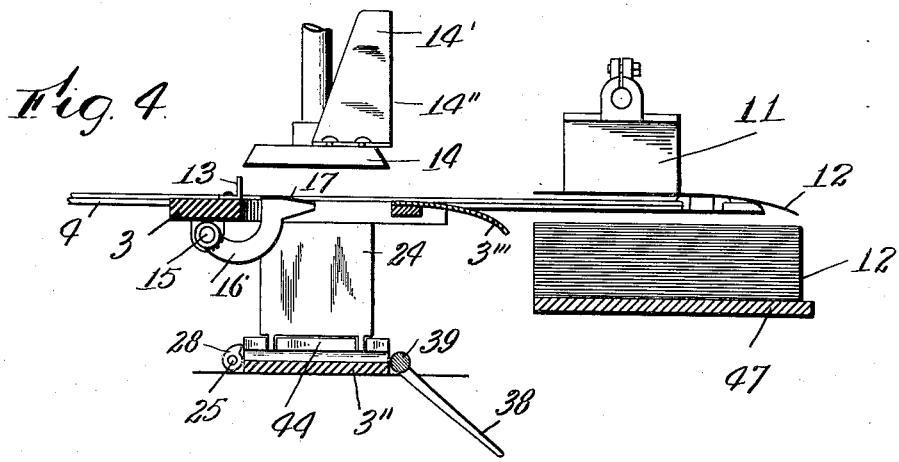
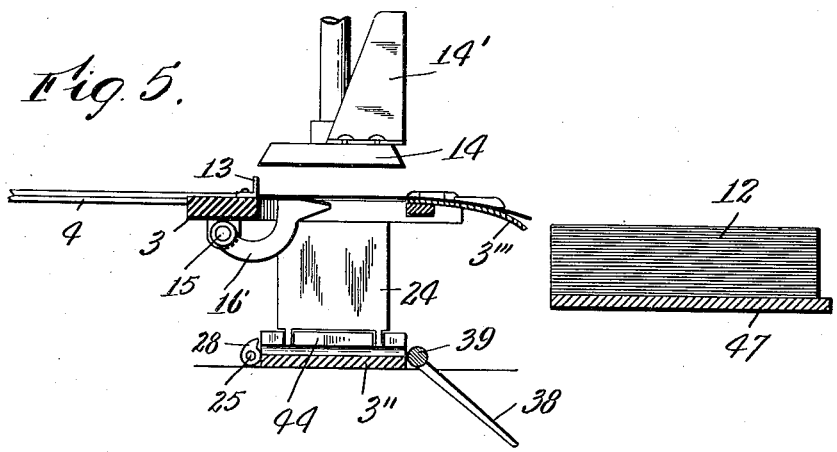
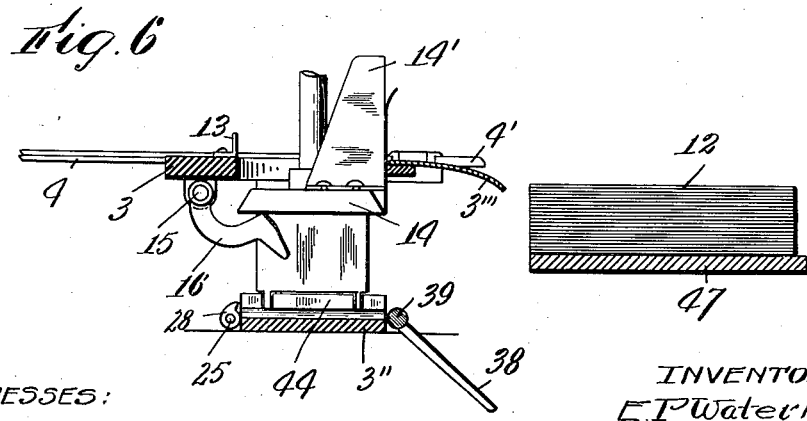

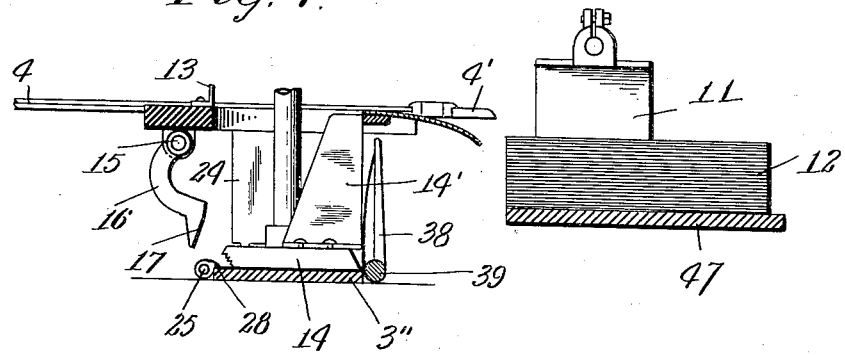
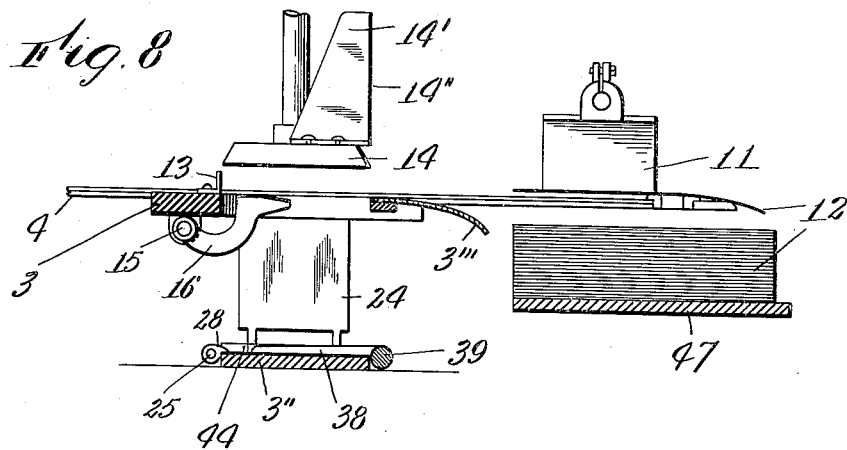
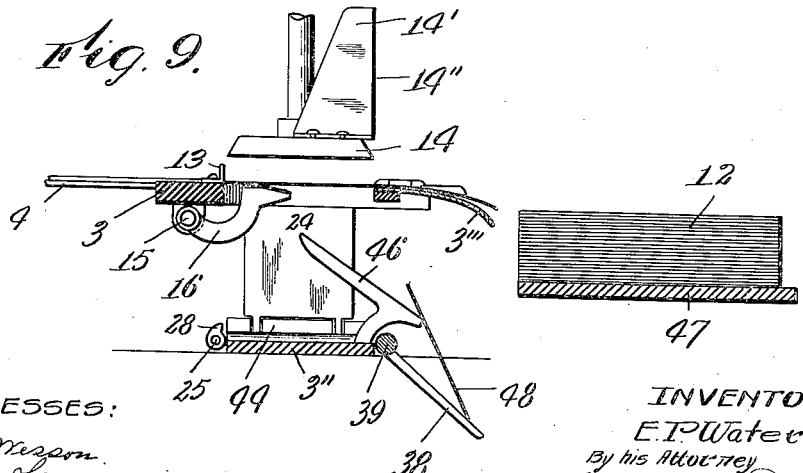

No. 890,829. PATENTED JUNE 16, 1908.
E. P. WATERHOUSE.
ENVELOP MACHINE.
APPLICATION FILED JULY 5, 1904.

5 SHEETS—SHEET 5.

WITNESSES:
C. F. Nesson
M. Haas

INVENTOR:
E. P. Waterhouse
By his Attorney
John C. Dewey

UNITED STATES PATENT OFFICE.

EZRA P. WATERHOUSE, OF WORCESTER, MASSACHUSETTS, ASSIGNOR OF ONE-HALF TO WORCESTER ENVELOPE COMPANY, A CORPORATION OF MASSACHUSETTS.

ENVELOP-MACHINE.

No. 890,829.  Specification of Letters Patent.  Patented June 16, 1908.

Application filed July 5, 1904. Serial No. 215,405.

*To all whom it may concern:*

Be it known that I, EZRA P. WATERHOUSE, a citizen of the United States, residing at Worcester, in the county of Worcester and State of Massachusetts, have invented certain new and useful Improvements in Envelop-Machines, of which the following is a specification.

My invention relates to improvements in envelop machines, and more particularly to improvements for making photograph envelops, or envelops for holding individual photographs, to form a removable covering to protect the same from injury. This class of envelops, without a flap, and open at one edge, is now very extensively used by photographers to receive individual photographs, ordinarily of "cabinet" size, mounted on cards. These envelops are ordinarily made of very thin, transparent tissue paper, which is cut up into blanks of the desired size. The paper is so thin that the blanks cannot be handled in the ordinary envelop machines for making commercial envelops, etc., and for this reason the class of envelops referred to have ordinarily been made by hand without the employment of machinery, from blanks previously cut out, by first folding over the blank, at about the middle portion, and then folding over the gummed edges on one portion, to form the closed ends.

The object of my invention is to provide mechanism, to be combined with the parts of a power envelop machine of ordinary construction and operation, to make the class of envelops referred to, and my invention consists in certain novel features of construction of my mechanism, as will be hereinafter fully described, I have only shown in the drawings sufficient portions of an envelop machine of ordinary construction, with my mechanism combined therewith, to enable those skilled in the art to understand the construction and operation of the same.

Figure 2:
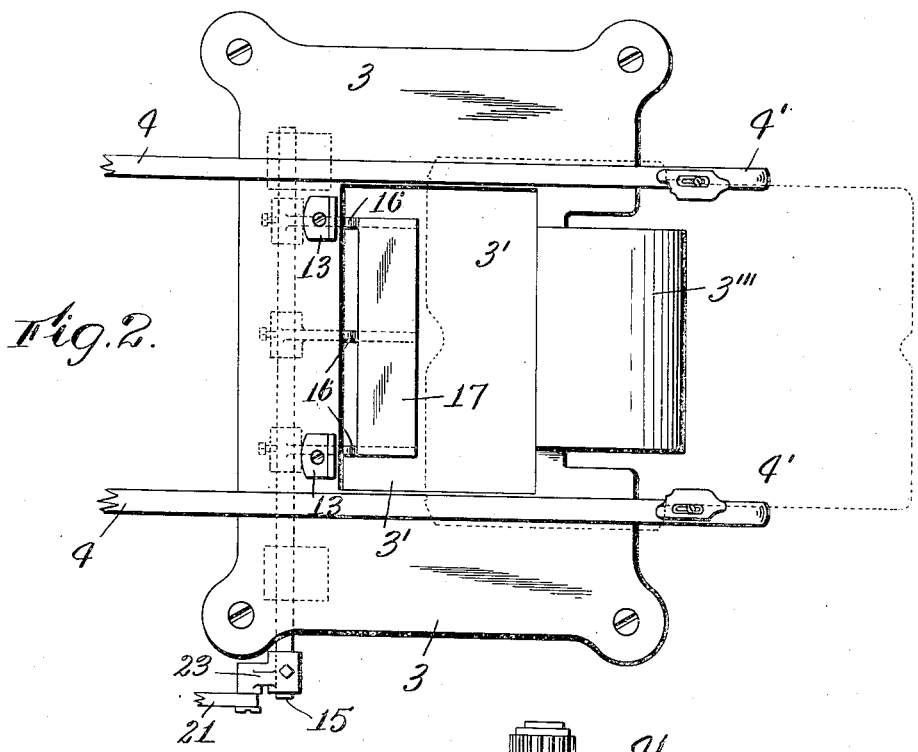
Figure 3:
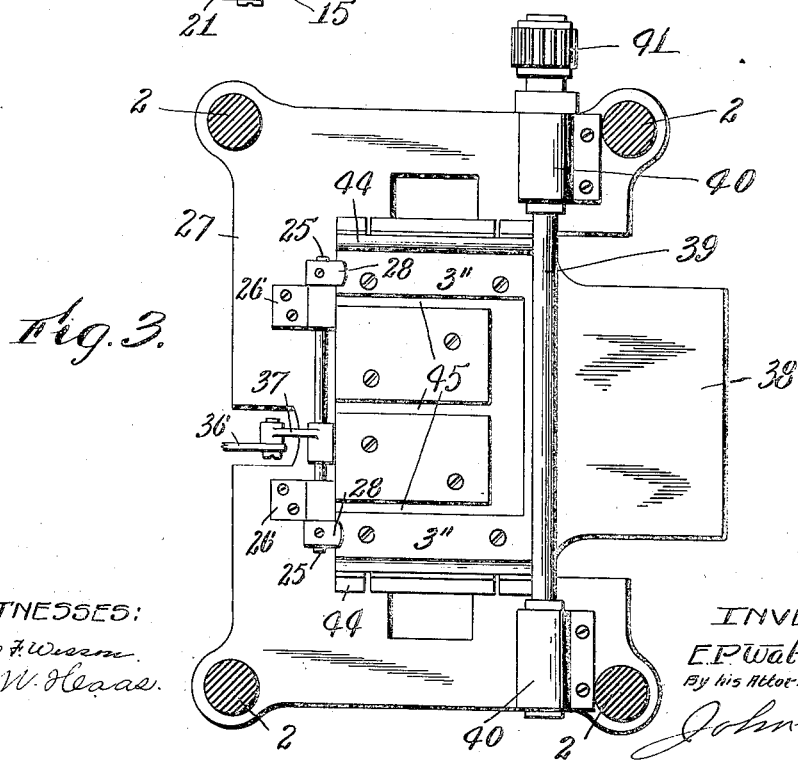
Figure 10:
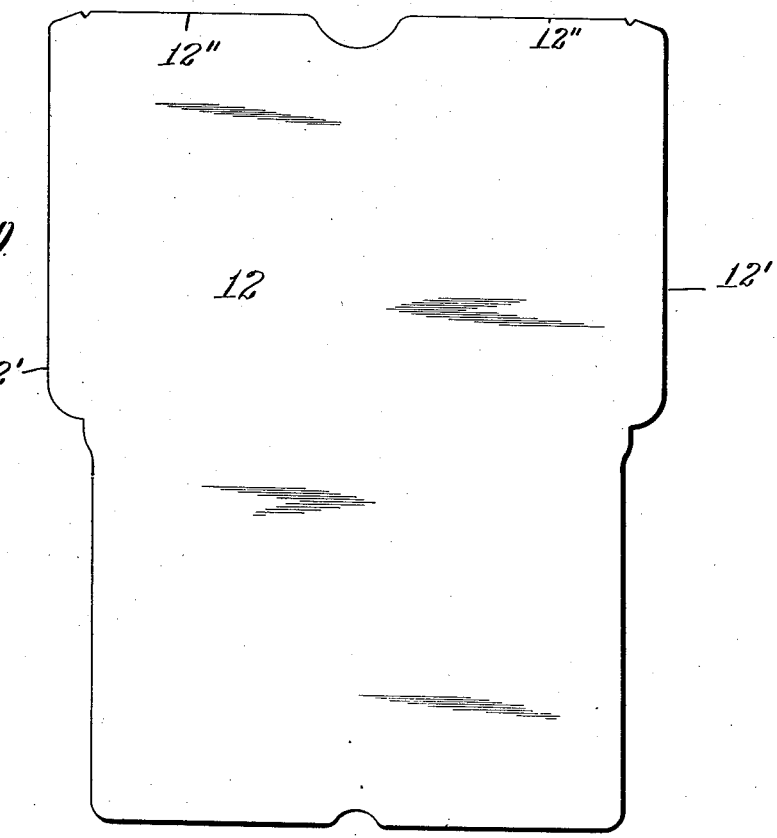
Figure 11:
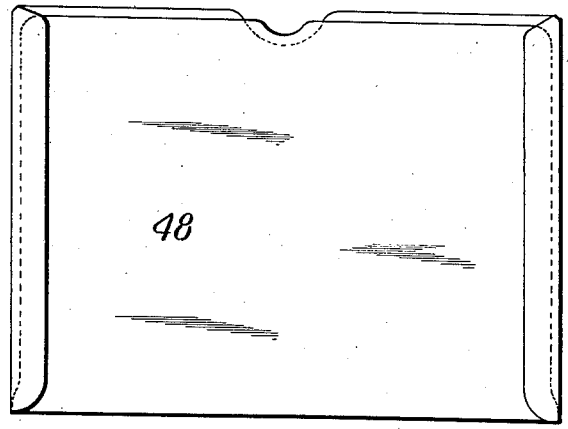

Referring to the drawings: Figure 1 is a sectional elevation of some of the parts of an envelop machine detached, and having my improvements combined therewith. Fig. 2 is, on an enlarged scale, a plan view of the top plate of the folding box, the envelop blank carriage, and the supporting fingers, and shows by broken lines an envelop blank on the carriage. Fig. 3 is, on an enlarged scale, a plan view of the bed of the folding box on which the blank is folded, showing the folders in their raised or open position. Fig. 4 is a vertical section through the envelop folding box, and shows the plunger, and one end gummer, and a pile of blanks, and the envelop blank carriage in its outer position, preparatory to taking a blank from the under side of the end gummer or pick up. Fig. 5 corresponds to Fig. 4, but shows the envelop blank carriage and the envelop blank thereon, after the carriage has been moved back, to carry the blank under the plunger. Fig. 6 corresponds to Fig. 5, but shows the plunger at the beginning of its downward stroke, preparatory to moving the blank down into the folding box and on to the folding bed. Fig. 7 corresponds to Fig. 6, but shows the plunger in its lowest position. Fig. 8 corresponds to Fig. 7, but shows the blank folded, and the plunger raised out of the folding box, and the envelop blank carriage moved forward, preparatory to receiving another blank. Fig. 9 corresponds to Fig. 8, but shows the removal of the envelop from the folding box, and another blank in position to be operated on by the plunger. Fig. 10 shows a blank before it is folded. Fig. 11 shows the completed envelop, made from the blank shown in Fig. 10, and, Fig. 12 is a modified construction of an envelop blank nipper, detached.

In the accompanying drawings, 1 is the table of the machine on which are mounted four posts or standards 2, which form the four corners of the folding box mechanism, and support on their upper ends the creaser plate 3, having grooves therein to receive the reciprocating slide bars 4, which form the envelop blank carriage, and has communicated to it at regular predetermined intervals, a reciprocating motion, through a link 5, pivotally attached to an arm or lever 6, mounted on a shaft or rod 7, and connected by a link 8, to an arm 9, fast on a rock shaft 10.

The forward ends of the carriage bars 4 have projecting hooks 4' thereon, and are adapted to be moved under the vertically moving gummers or pick ups 11, two in number, (only one of which is shown), and under an envelop blank 12, raised by the gummers 11 from a pile of blanks 12, see Fig. 4, to remove said blank 12 from the gummers and carry it over the opening 3' in the creaser plate 3, until it strikes against the stop bar 13. A creaser plunger 14 suitably supported, and having a vertical reciprocating motion communicated thereto in the ordinary way, extends over the opening 3' in the creaser plate 3, and is adapted to be moved down at the proper time, to engage the blank 12, and crease it, and move it down into the folding box, and onto the folding bed 3".

All of the above parts may be of the ordinary and well known construction in envelop machines.

I will now describe my improvements.

On a rock shaft 15, mounted in bearings upon the underside of the creaser plate 3, are fast in this instance, three rocking arms 16, which are adapted to be moved up into the opening 3' through the creasing plate 3, with their upper ends in the same plane as the top of the creaser plate, and to be moved down away from the creaser plate 3. The arms 16 act as supports for the main portion of the blank 12, to hold it up, when it is moved by the envelop carriage over the opening 3' in the creaser plate 3, and prevent it from sagging or dropping down, preparatory to the action of the creaser or plunger 14. The hinged arms 16, or their equivalent, to support the main portion of the thin tissue paper blanks, over the opening in the creaser plate, preparatory to the creasing of the blank by the plunger, are essential for the proper creasing of the blank and the successful operation of the machine, and these supporting arms or their equivalent, are one of the important features of my invention.

I have shown in the drawings, and I prefer to use, a thin sheet metal plate 17 secured to the ends of the supporting arms 16, upon which the envelop blank will rest, but I may use the arms 16 without said plate 17. A rocking motion is communicated to the shaft 15, to raise and lower the arms 16, in this instance, by a cam 18, fast on a driven shaft 19, which cam engages a roll 20 mounted on a lever 21, having an opening through its lower end to receive the shaft 19, and a spring 22 secured thereto, to hold the roll 20 in engagement with the cam 18. The upper end of the lever 21 is connected to an arm 23, fast on the rock shaft 15.

Extending out from the creaser plate 3 is an inclined or curved plate 3''', to receive and support the projecting portion of a blank 12, preparatory to the operation of the creaser plunger 14, see Fig. 5. The plunger 14 preferably has a vertically extending plate 14' secured on each end thereof, the outer edges 14'' of which act as a support and guide for the creased portion of the blank 12, as it is carried down into the folding box, see Fig. 6. The folding bed 3", onto which the blank 12 is carried by the descent of the plunger 14, has at each end a vertically extending metal plate 24, which act as guides for the blank, in the ordinary way.

At the front of the folding bed 3" is a rocking shaft 25, having bearings 26 secured on the bottom plate 27 of the folding box. The shaft 25 has fast on each of its ends a nipper 28, which nippers are adapted to engage and hold the outer edge of the blank 12, which edge is not to be folded after the blank has been creased and pressed down by the plunger 14 onto the folding bed 3", as shown in Fig. 7, preparatory to the operation of the hinged or rocking folders, to fold three edges of the blank on the withdrawal of the plunger 14. The nippers 28 may be eccentrically mounted, by having the opening therein eccentric to the center, as shown in Fig. 12. A rocking motion is communicated to the shaft 25, to operate the nippers 28 at the proper time, by a cam 29, fast on the driven shaft 19, engaging a roll 30 mounted on a lever 31, provided with an opening 31' through its lower end, to receive the shaft 19, and having a spring 32 attached thereto, to hold the roll 30 in engagement with the cam 29. The upper end of the lever 31 is pivotally connected to one end of a lever 33, centrally pivoted on a stud 34, on a hanger 35. The other end of the lever 33 is connected by a link 36 with an arm 37 fast on the rocking shaft 25, see Figs. 1, and 3. The nippers 28 are essential to hold the creased blank in position on the folding bed ready for the folders to fold three edges of the blank, and these nippers are another important feature of my invention.

At the inner edge of the folding bed is the front folder 38, which in this instance is fast on a rocking shaft 39, mounted in suitable bearings 40 on the bottom plate 27, and having a pinion 41 fast thereon, which is engaged and operated by a rack bar 42, see Fig. 1, the lower end of which, not shown, is operated by a cam on the driven shaft 19, in the ordinary way. The front folder 38 is operated, to move from its lowest inclined position, shown in Figs. 1, and 9, where it acts as a guide to direct the folded blank or envelop into the receiving box 43, to an upright position, as shown in Fig. 7, to engage the blank 12, after it is creased and moved down onto the folding bed by the plunger 14, and to fold over one portion of the blank, upon the other portion, as shown in Fig. 8, as the plunger 14 is withdrawn from the folding box. At each end of the folding bed 3" is an end folder 44, which is mounted on a rocking shaft in the ordinary way, and operated in the ordinary way by mechanism not shown, to fold the gummed edges 12' of the envelop blank 12, on to the portion of the blank folded by the front folder 38, to form the closed ends, as shown in Fig. 11. Extending through slots 45 in the folding bed 3", are envelop lifting and discharging fingers 46, see Fig. 9, of the ordinary construction, and operated in the ordinary way by mechanism not shown, to raise the folded blank or envelop out of the folding box, and deliver it on the front folder 38, where it is guided into the receiving box 43.

From the above description in connection with the drawings, the operation of my improvements will be readily understood by those skilled in the art. The blanks 12 are first cut out, preferably in the shape shown in Fig. 10, and of the desired size, and are arranged in a pile on the paper table 47. The lower edges of the two gummers or pick ups 11 have the gum deposited thereon by gum rolls, not shown, in the ordinary way. After the gum is deposited on the gummers 11, said gummers are lowered to engage the extended edges 12' on the blank 12, see Fig. 10, to apply the gum thereto. The gummers 11 are then raised, and carry up with them one of the blanks 12, as shown in Fig. 4. The envelop blank carriage 4 is then moved under the blank, as shown in Fig. 4, the plunger 14 being in its raised position, and the supporting arms 16 in their raised position, as shown in Fig. 4. The carriage 4 is then moved in the opposite direction, to carry the blank 12 over the opening 3' in the creaser plate 3, as shown by broken lines in Fig. 2, and full lines in Fig. 5. The main portion of the blank is supported on the arms 16. The engagement of the blank 12 with the stop 13 limits the movement of the blank. The plunger 14 descends, and as it descends, creases and forces the blank down through the opening 3', on to the folding bed 3". The arms 16 move down to support the blank, as shown in Fig. 6. When the plunger 14 has reached its lowest position, as shown in Fig. 7, the arms 16 have moved away, to their lowest position, as shown, and the nippers 28 have been moved into position to hold the edge 12" of the main portion of the blank, preparatory to the withdrawal of the plunger 14, and the operation of the front folder 38 and the two end folders 44. As the plunger 14 is withdrawn, the arms 16 are moved up, and the front folder 38, and the two end folders 44 are operated, to fold the creased blank, and form the envelop 48, as shown in Fig. 11. After the envelop is folded, the lifting fingers 46 are operated to raise the envelop from the folding bed 3", and discharge it onto the front folder 38, which, with the end folders 44, and the nippers 28, have been moved into their opposite or open positions, as shown in Fig. 9. The envelop carriage 4 has again been moved to take another blank 12 from the gummers 11 and return with it, into position over the opening 3' in the creaser plate 3, to be engaged by the plunger 14, as shown in Fig. 9, and the operation of creasing and folding the blank is repeated.

The advantages of my improvements will be readily appreciated by those skilled in the art.

I provide mechanism, combined with a power automatic envelop machine of any ordinary construction, to make the class of envelops referred to.

It will be understood that the details of construction of my improvements may be varied if desired.

Having thus described my invention, what I claim as new and desire to secure by Letters Patent is:—

1. In an envelop machine, the combination with the creaser plate, of an arm or arms for supporting the envelop blank over the opening in the creaser plate, and means for moving said arms.

2. In an envelop machine, the combination with the creaser plate, of a rocking arm or arms for supporting the envelop blank over the opening in the creaser plate, and means for rocking said arms.

3. In an envelop machine, the combination with a creaser plate, of a movable arm or arms for supporting the envelop blank over the opening in the creaser plate and a plate on said arm or arms, and means for moving said arms.

4. In an envelop machine, the combination with a creaser plate, of a rocking arm or arms supported on the under side of the creaser plate, to support the envelop blank over the opening in the creaser plate, and to move down with the envelop blank into the folding box, and to be moved out of the path of the blank, and means for rocking said arms.

5. In an envelop machine, the combination with the folding-bed, of rocking nippers eccentrically mounted and located at the rear of the folding-bed, said nippers adapted to engage the edge of the envelop blank, and hold the same on the folding-bed, and means for rocking said nippers.

EZRA P. WATERHOUSE.

Witnesses:
M. HAAS,
J. C. DEWEY.